Sept. 15, 1942.   L. VAN LOO   2,296,003

AUTOMATIC VEHICLE CONTROL

Filed April 21, 1941

LIVINUS VAN LOO

INVENTOR.

BY

Patented Sept. 15, 1942

2,296,003

UNITED STATES PATENT OFFICE 2,296,003

AUTOMATIC VEHICLE CONTROL

Livinus Van Loo, Detroit, Mich., assignor of one-half to George E. Robinson, Detroit, Mich.

Application April 21, 1941, Serial No. 389,527

1 Claim. (Cl. 192—3)

This invention relates to a so-called "dead man" control for automobiles and has for its primary object to provide a control system which functions to apply the brakes and to open the ignition system of the automobile under emergency conditions such as, for example, when the operator falls asleep.

More specifically, the main object is to provide a system of the type above mentioned which comprises an electric circuit with a control switch on the steering wheel of the automobile which must be held in a predetermined position by the operator in order to prevent the system from causing application of the brakes and opening of the ignition system. The steering wheel switch is in circuit with the battery of the vehicle and in the absence of pressure thereon completes a circuit to an electrically operated valve which controls suction operated means for applying the brakes and also a solenoid operated switch which controls the ignition system.

Another object is to provide a system of the type above mentioned which includes a manual control for rendering the control circuit operative or inoperative at the will of the operator. This permits the operator to eliminate the "dead man" control under ordinary city driving conditions and to place it in operative condition on long trips where there is greater danger of the operator falling asleep.

Other objects and advantages will become more fully apparent as reference is had to the accompanying drawing wherein my invention is illustrated, and in which—

Figure 1:
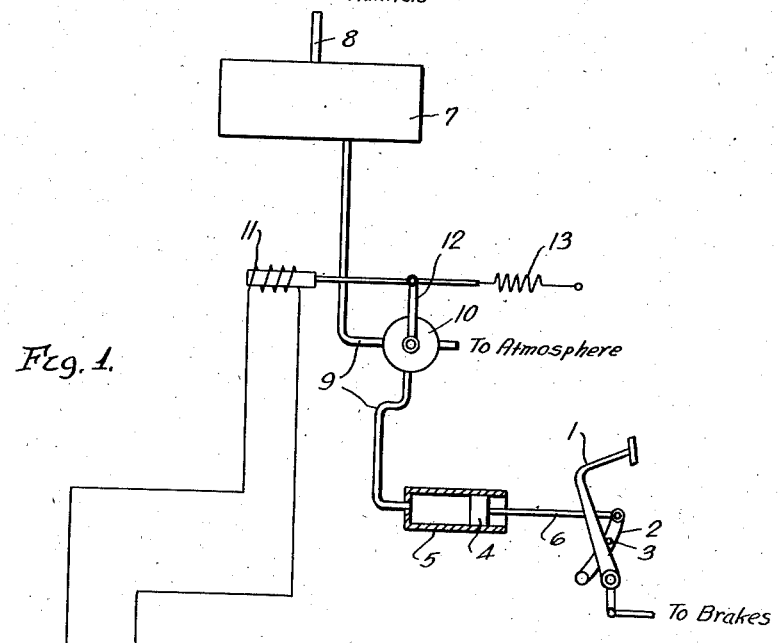
Fig. 1 is a diagram of the circuit.

More specifically, 1 designates a vehicle brake pedal which is connected in the usual manner to the brakes (not shown). A lever 2 is pivotally mounted adjacent the pedal and has a pin 3 thereon which engages the pedal as the lever is swung on its pivot. A piston 4, slidably mounted in a cylinder 5, is connected by a rod 6 to the lever 2, and as the piston is moved it swings the lever 2 and pulls the brake pedal in a direction to apply the brakes.

A booster reservoir 7 is connected by a line 8 to the intake manifold (not shown) of the vehicle and by a line 9 to the cylinder 5. A two way valve 10 is mounted in the line 9 which when in one position connects the cylinder with the suction booster 7 and its other position connects the cylinder 5 with the atmosphere. A solenoid 11 is connected to the operating lever 12 of the valve 10 and when energized moves the valve to a position where the cylinder 5 is connected with the reservoir 7. A spring 13 is also connected to the valve lever 12 and normally holds the valve in a position connecting the cylinder 5 with the atmosphere.

The vehicle ignition system is generally indicated by the wires 14 and includes a battery 15 and the standard ignition switch 16. In addition the ignition circuit is provided with a switch 17 which is normally held closed by a spring 18 and which is adapted to be opened by a solenoid 19. The solenoid 19 is in circuit with the battery 15 and is controlled by a switch 20 which is normally held open by a spring 21 and which is adapted to be closed by a solenoid 22. The solenoid 11, above described, is connected in series by the switch 20, so that when the solenoid 22 is energized to cause opening of the switch 19 and consequently opening of the ignition system the solenoid 11 is simultaneously energized to cause actuation of the valve 10.

The steering wheel of the vehicle is represented at 23. On the steering wheel is a switch 24, more particularly described hereinafter, which is normally closed and which is adapted to be opened by manual pressure when the vehicle operator grasps the wheel. The switch 24 is in circuit with the battery 15 and the solenoid 22.

The operation of the system is as follows: When the switch 24 is closed, as it will be in the absence of manual pressure thereon, the solenoid 22 is energized. The solenoid 22 closes the switch 20 which causes energization of the solenoid 19, thereby causing the switch 17 to open and render the ignition system inoperative, and simultaneously energizes the solenoid 11 to cause application of the brakes. When the switch 24 is opened by manual pressure the solenoid 22 is de-energized, the switch 20 is again opened, the solenoids 11 and 19 are de-energized, the brakes are released and the spring 18 closes the switch 17 and renders the ignition system operative.

In circuit with the steering wheel switch 24 is a manual switch 28 which permits the operator to render the "dead man" control inoperative under conditions such as city driving where its presence would be a handicap rather than an asset. The switch 24 also permits the operator to render the control system inoperative when the vehicle is parked.

Figure 2:
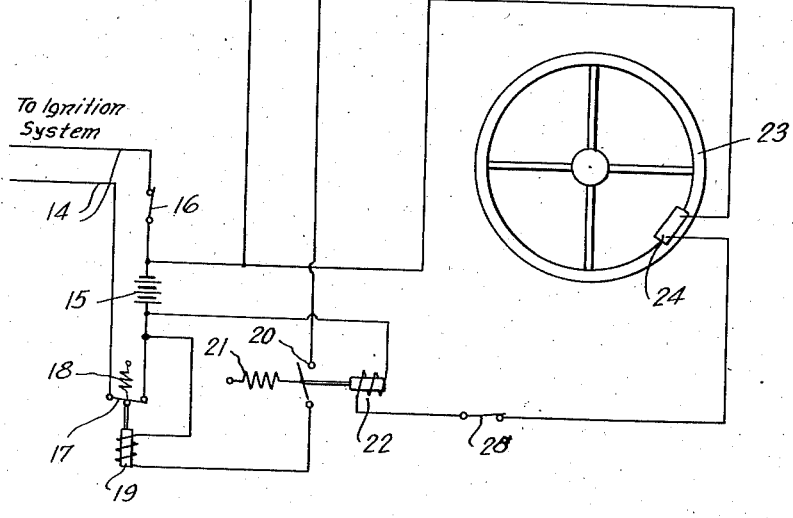
Fig. 2 is a sectional view illustrating the steering wheel switch.
Figure 2:
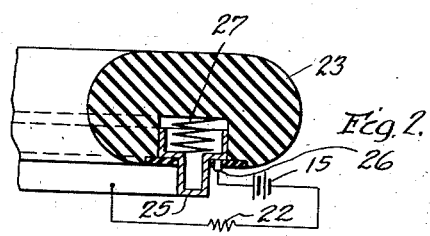

The steering wheel switch, as more clearly illustrated in Fig. 2, preferably comprises a circular contact 25 which is held against the contact 26 by springs 27, one of which is shown. As the contact 25 is pressed inwardly by manual pressure the circuit is opened. By providing a circular contact of this type, completely encircling the steering wheel, the switch may be held open by manual pressure at any point in the circumference of the steering wheel.

Although a specific embodiment of the invention has been illustrated and described, it will be understood that various changes may be made within the scope of the appended claim without departing from the spirit of the invention and such changes are contemplated.

What I claim is:

A control system for a vehicle having a steering wheel, a suction manifold and a brake pedal, comprising a cylinder, a piston in said cylinder and connected to said brake pedal for moving said pedal in a direction to apply the brakes of the vehicle, means including a suction booster reservoir and a valve for connecting said cylinder with said suction manifold and with the atmosphere, electrically operated means for moving said valve to a position connecting said cylinder with said manifold, a spring for moving said valve to a position connecting said cylinder with the atmosphere, and a circuit for energizing said electrically operated means, said circuit having a control switch mounted on said steering wheel and adapted to be manually held in a position maintaining said electrically operated means de-energized, an ignition switch for the engine of said vehicle, a control switch in circuit with said ignition switch, and means in the first named circuit operative to open said last named switch thereby stopping said engine when the control switch on said steering wheel is opened.

LIVINUS VAN LOO.